(12) United States Patent
Jain

(10) Patent No.: US 11,048,544 B2
(45) Date of Patent: Jun. 29, 2021

(54) CLOUD RESOURCE CREDENTIAL PROVISIONING FOR SERVICES RUNNING IN VIRTUAL MACHINES AND CONTAINERS

(71) Applicant: SAP SE, Walldorf (DE)

(72) Inventor: Shashank Mohan Jain, Karnataka (IN)

(73) Assignee: SAP SE, Walldorf (DE)

(*) Notice: Subject to any disclaimer, the term of this patent is extended or adjusted under 35 U.S.C. 154(b) by 121 days.

(21) Appl. No.: 16/377,499

(22) Filed: Apr. 8, 2019

(65) Prior Publication Data
US 2020/0319907 A1 Oct. 8, 2020

(51) Int. Cl.
*G06F 9/455* (2018.01)
*G06F 9/54* (2006.01)
*H04L 29/08* (2006.01)

(52) U.S. Cl.
CPC .......... *G06F 9/45558* (2013.01); *G06F 9/541* (2013.01); *H04L 67/02* (2013.01); *G06F 2009/45575* (2013.01); *G06F 2009/45595* (2013.01)

(58) Field of Classification Search
CPC ............... G06F 9/45558; G06F 9/541; G06F 2209/45595; G06F 2209/45575; G06F 16/95; G06F 2009/45595; G06F 2009/45575; H04L 67/02
See application file for complete search history.

(56) References Cited

U.S. PATENT DOCUMENTS

| | | | |
|---|---|---|---|
| 6,331,987 B1* | 12/2001 | Beser | H04L 47/24 348/E7.07 |
| 9,424,419 B1* | 8/2016 | Kruse | G06F 21/31 |
| 10,268,514 B1* | 4/2019 | Kesarwani | G06F 9/5011 |
| 10,776,173 B1* | 9/2020 | Greenwood | G06F 9/5077 |
| 2008/0109876 A1* | 5/2008 | Hitomi | H04L 41/0813 726/2 |
| 2013/0097325 A1* | 4/2013 | Mann | H04W 76/12 709/227 |
| 2013/0181998 A1* | 7/2013 | Malakapalli | G06F 9/45558 345/503 |

(Continued)

*Primary Examiner* — Emerson C Puente
*Assistant Examiner* — Zhi Chen
(74) *Attorney, Agent, or Firm* — Buckley, Maschoff & Talwalkar LLC

(57) ABSTRACT

Some embodiments may be associated with a cloud computing environment. A cloud resource credential management system may be provisioned as part of a virtual machine deployment, access information associated with an application or a service configuration file and establish a cloud resource credential provisioning system external to an application to be executed in connection with the virtual machine. The cloud resource credential provisioning system may, for example, map a cloud resource policy and a cloud resource credential. The cloud resource credential provisioning system may then intercept a cloud resource call from the application to a cloud resource provider and validate that the cloud call request complies with the cloud resource policy. If the cloud resource call complies with the cloud resource policy, the cloud resource credential provisioning system may extend the cloud resource call with the cloud resource credential and forward the extended cloud resource call to the cloud resource provider.

13 Claims, 14 Drawing Sheets

(56) References Cited

U.S. PATENT DOCUMENTS

| | | | | |
|---|---|---|---|---|
| 2014/0130142 A1* | 5/2014 | Plewnia | ............... | H04L 63/102 |
| | | | | 726/5 |
| 2014/0192804 A1* | 7/2014 | Ghanwani | ............... | H04L 12/18 |
| | | | | 370/390 |
| 2015/0046425 A1* | 2/2015 | Lin | ............... | G06F 9/4843 |
| | | | | 707/708 |
| 2015/0074183 A1* | 3/2015 | Clothier | ............... | H04L 67/1097 |
| | | | | 709/203 |
| 2015/0222604 A1* | 8/2015 | Ylonen | ............... | G06F 21/575 |
| | | | | 713/171 |
| 2015/0350188 A1* | 12/2015 | Gilpin | ............... | H04L 63/083 |
| | | | | 726/9 |
| 2016/0330230 A1* | 11/2016 | Reddy | ............... | H04L 9/002 |
| 2018/0145955 A1* | 5/2018 | Nirwal | ............... | H04L 63/06 |
| 2018/0241690 A1* | 8/2018 | Spatzier | ............... | H04L 67/10 |
| 2018/0359323 A1* | 12/2018 | Madden | ............... | H04L 67/104 |
| 2019/0052643 A1* | 2/2019 | Doshi | ............... | G06N 5/04 |
| 2019/0347406 A1* | 11/2019 | Lev-Ran | ............... | G06F 21/64 |

* cited by examiner

CLOUD RESOURCE CREDENTIAL PROVISIONING FOR SERVICES RUNNING IN VIRTUAL MACHINES AND CONTAINERS

BACKGROUND

An enterprise may utilize applications executing in a cloud computing environment. For example, a business might utilize applications that execute at a data center to process purchase orders, human resources tasks, payroll functions, etc. In some cases, such applications need to access a cloud resource, such as an object storage or a virtual Internet Protocol ("IP") address resource. To enhance security, a data center might require that an application provide credentials to access the cloud resource. For example, FIG. 1 is a high-level block diagram of a cloud computing system 100. The system 100 includes an application 120 executing on a platform 110 of the data center. The application 120 might be running, for example, in the context of a virtual machines or container. To access a cloud resource 190, the application 120 accesses locally stored credentials 130 (e.g., packaged as part of application/service configuration files which are persisted so as to survive restarts and/or re-creation of the virtual machine or container). At (A), the credentials are provided from the application 120 to the cloud resource 190. After verifying the credentials, the cloud resource (B) provides the requested action at (B). Such an implementation may introduce challenges related to security. For example, any compromise of the application 120 (e.g., a cyber-attack) may expose the credentials 130 to an attacker. To avoid such a result, this type of attack could be minimized with a policy such as credential rotation. This approach, however, adds overhead to the service provisioner (and note that thousands of platforms may need to be restarted to implement such a credential rotation) and will still not fully remove the problem. It would therefore be desirable to provide resource credential provisioning for a cloud computing environment in a secure, automatic, and accurate manner.

SUMMARY

Methods and systems may be associated with a cloud computing environment. A cloud resource credential management system may be provisioned as part of a virtual machine deployment, access information associated with an application or a service configuration file and establish a cloud resource credential provisioning system external to an application to be executed in connection with the virtual machine. The cloud resource credential provisioning system may, for example, map a cloud resource policy and a cloud resource credential. The cloud resource credential provisioning system may then intercept a cloud resource call from the application to a cloud resource provider and validate that the cloud call request complies with the cloud resource policy. If the cloud resource call complies with the cloud resource policy, the cloud resource credential provisioning system may extend the cloud resource call with the cloud resource credential and forward the extended cloud resource call to the cloud resource provider.

Some embodiments comprise: means for provisioning a cloud resource credential management system as part of a virtual machine deployment; means for accessing, by the cloud resource credential management system, information associated with an application or a service configuration file; and means for establishing, by the cloud resource credential management system, a cloud resource credential provisioning system external to an application to be executed in connection with the virtual machine, the cloud resource credential provisioning system mapping a cloud resource policy and a cloud resource credential.

Other embodiments comprise: means for intercepting, by a cloud resource credential provisioning system, a cloud resource call from an application to a cloud resource provider; means for validating, by the cloud resource credential provisioning system, that the cloud call request complies with a cloud resource policy; and if the cloud resource call complies with the cloud resource policy, means for extending, by the cloud resource credential provisioning system, the cloud resource call with the cloud resource credential and forward the extended cloud resource call to the cloud resource provider Some technical advantages of some embodiments disclosed herein are improved systems and methods to provide resource credential provisioning for a cloud computing environment in a secure, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
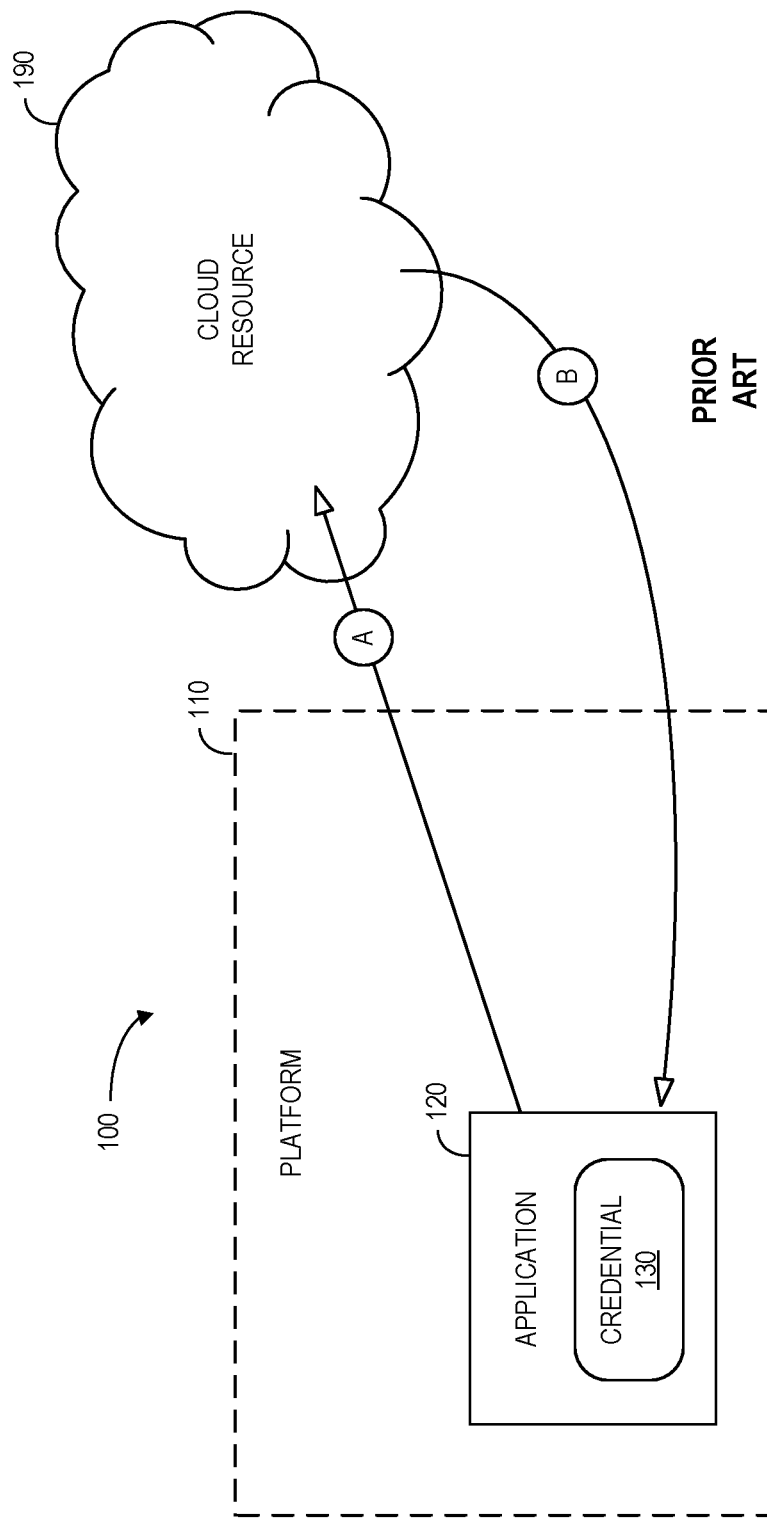
FIG. 1 is a high-level block diagram of a cloud computing system.
Figure 2:
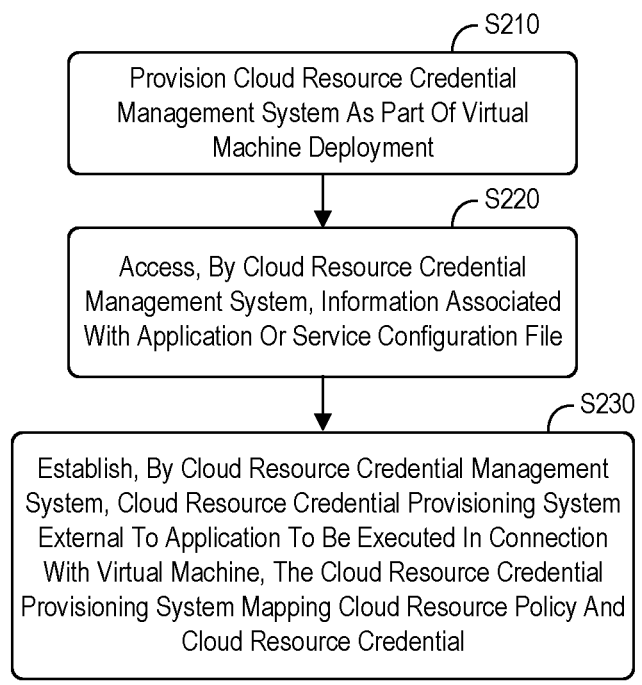
FIG. 2 is a provisioning method according to some embodiments.

To provide improved resource credential provisioning for a cloud computing environment in a secure, automatic, and accurate manner, FIG. 2 is a provisioning method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, a cloud resource credential management system may be provisioned as part of a virtual machine deployment. The cloud resource credential management system may be, according to some embodiments, associated with a cloud orchestrator. At S220, the cloud resource credential management system may access information associated with an application or a service configuration file. At S230, the cloud resource credential management system may establish a cloud resource credential provisioning system external to an application to be executed in connection with the virtual machine. The cloud resource credential provisioning system might, according to some embodiments, map a cloud resource policy and a cloud resource credential. The cloud orchestrator might, according to some embodiments, establish the cloud resource provisioning system via an attach resource Application Programming Interface ("API"). The attach resource API might include, for example, a resource name, an application identifier, and a cloud resource access type (e.g. associated with access types such as create, delete, bind, role-based access types, etc.).

Figure 3:
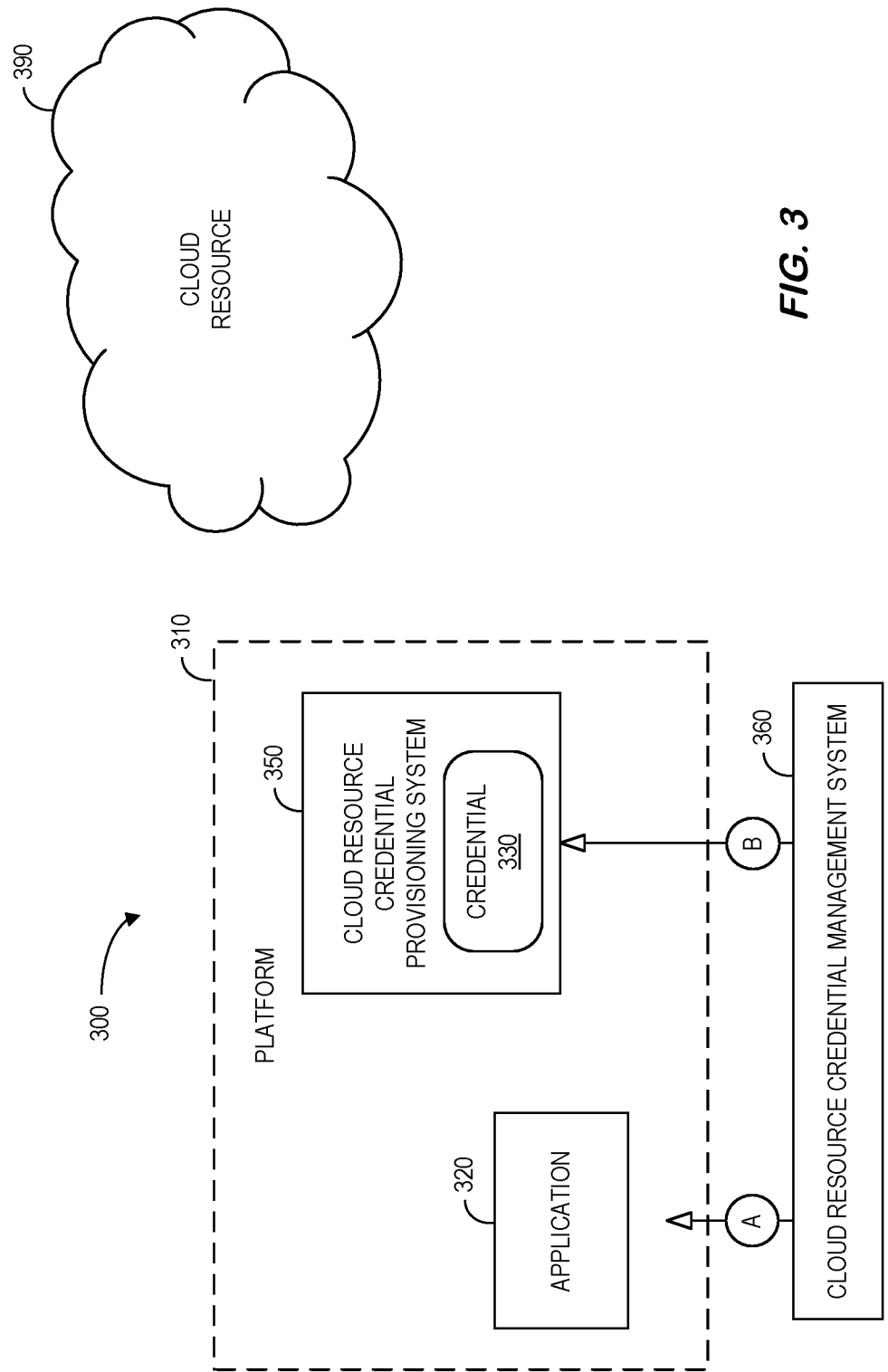
FIG. 3 is a high-level block diagram of system provisioning in accordance with some embodiments.

FIG. 3 is a high-level block diagram of system 300 provisioning in accordance with some embodiments. At (A), a cloud resource credential management system 360 arranges for an application 320 to execute on a data center platform 310. The application 320 might be running, for example, in the context of a virtual machines or container. At (B), the cloud resource credential management system 360 establishes a cloud resource credential provisioning system 350 (e.g., a "credential mapper") in connection with the platform 310 and external to the application 320. According to some embodiments, this process might be performed automatically. As used herein, the term "automatically" may refer to, for example, actions that can be performed with little or no human intervention. The cloud resource credential provisioning system 350 may store credentials 330 that are needed by one or more applications 320 in order to access cloud resources 390. In this way, even if the application 320 were to become compromised for any reason, an attacker would not have access to the credentials 330.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The cloud resource credential management system 360 may store information into and/or retrieve information from various data stores, which may be locally stored or reside remote from the cloud resource credential management system 360. Although a single cloud resource credential management system 360 and cloud resource credential provisioning platform are shown in FIG. 3, any number of such devices may be included. Moreover, various devices described herein might be combined according to embodiments of the present invention. For example, in some embodiments, the cloud resource credential management system 360 and a credential data store might comprise a single apparatus. The system 300 functions may be performed by a constellation of networked apparatuses, such as in a distributed processing or cloud-based architecture.

A user may access the system 300 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement a credential rotation policy) and/or provide or receive automatically generated recommendations or results from the system 300.

Figure 4:
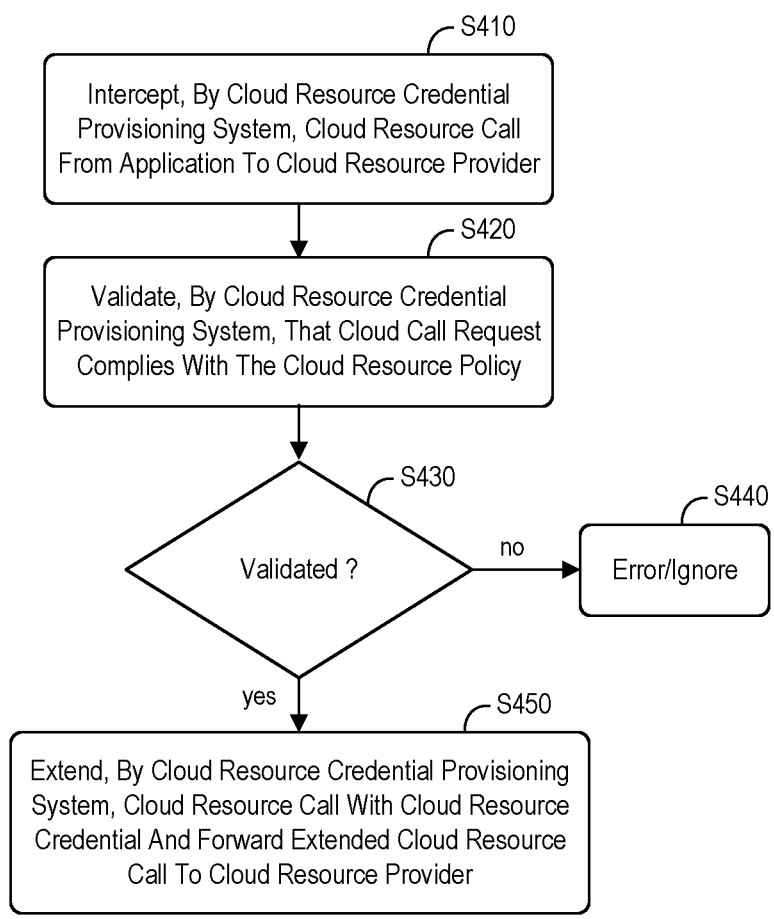
FIG. 4 is a runtime method according to some embodiments.

FIG. 4 is a runtime method according to some embodiments. At S410, a cloud resource credential provisioning system may intercept a cloud resource call from an application to a cloud resource provider. The cloud resource call might be associated with, for example, object storage, a control plane Application Programming Interface ("API"), virtual Internet Protocol ("IP") attachment, etc. At S420, the cloud resource credential provisioning system may validate that the cloud call request complies with the cloud resource policy. If the call is not validated at S430, the call may be ignored and/or an error may be returned at S440.

If the call is validated at S430 (that is, the cloud resource call complies with the cloud resource policy), the cloud resource credential provisioning system may extend the cloud resource call with an appropriate cloud resource credential and forward the extended cloud resource call to the cloud resource provider at S450.

According to some embodiments (e.g., described in connection with FIGS. 7 and 8), the cloud resource credential provisioning system executes in a hypervisor external to the virtual machine executing the application within the hypervisor. In this case, the cloud resource call might comprise a Hyper Text Transfer Protocol ("HTTP") call from the application to the cloud provider. In other embodiments (e.g., described in connection with FIGS. 9 and 10), the cloud resource credential provisioning system executes in the virtual machine external to a container executing the application within the virtual machine. This these cases, the cloud resource call might comprise an outbound network call via an overlay network to a service container that is intercepted by an extended Berkley Packet Filter ("eBPF") program.

Figure 5:
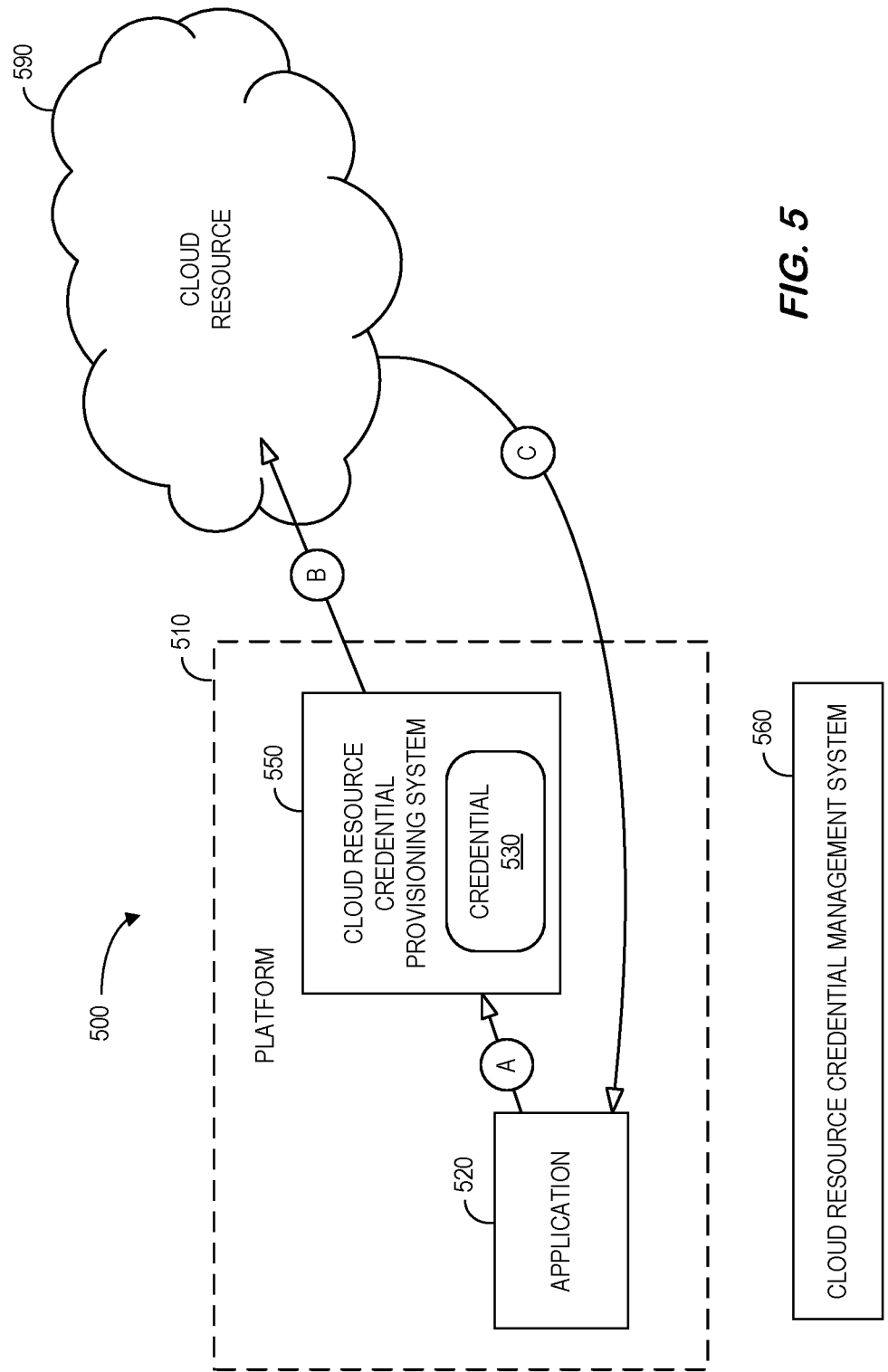
FIG. 5 is a high-level block diagram of a system at run time in accordance with some embodiments.

FIG. 5 is a high-level block diagram of a system 500 at run time in accordance with some embodiments. As before, a cloud resource credential management system 560 arranged for an application 520 to execute on a data center platform 510. The application 520 might be running, for example, in the context of a virtual machines or container. The cloud resource credential management system 560 also established a cloud resource credential provisioning system 550 (e.g., a "credential mapper") in connection with the platform 510 and external to the application 520. The cloud resource credential provisioning system 550 also stored credentials 530 that are needed by one or more applications 520 in order to access cloud resources 590. At (A), the cloud resource credential provisioning system 550 intercepts a cloud resource call from the application 520 to the cloud resource provider 590. The cloud resource call might be associated with, for example, object storage, a control plane API, virtual IP attachment, etc. The cloud resource credential provisioning system 550 may then validate that the cloud call request complies with a cloud resource policy. If the call is not validated, the call may be ignored and/or an error may be returned to the application 520.

If the call is validated by the cloud resource credential provisioning system 550 (that is, the cloud resource call complies with the cloud resource policy), the cloud resource credential provisioning system 550 extends the cloud resource call with the appropriate cloud resource credential 530 and forward the extended cloud resource call to the cloud resource provider at (B). The cloud resource provider 590 may then provide the needed resource directly to the application 520 at (C). As a result, even if the application 520 hacked or attacked, an unauthorized party would not have access to the credentials 530. According to some embodiments, the cloud resource credential management system 560 may also implement a credential policy across a plurality of virtual machine. The credential policy might comprise, for example, a credential rotation policy.

Thus, some embodiments described herein provide a mechanism via which credentials may be provisioned on an underlying hypervisor (in the case of virtual machine-based provisioning) or a virtual machine (in the case where containers are provisioned on the virtual machine of the cloud provider (instead defining the credentials in a configuration file provisioned on the actual virtual machine or container). The proposal a contract between the cloud provider or container orchestrator and the application provider may be define via an AttachResourceAPI. The API might, for example, take as inputs the resource name, the virtual machine identifier or the container identifier and an access type. A consumer may then make a call to the cloud provider or container orchestrator via this API. For example, the resource type could be a "virtual IP," the access type could be "create/delete/bind," and a list of identifiers of approved virtual machines or containers may be included.

Upon receiving such a request, a cloud provider/container orchestrator may create the appropriate credentials for the resource and map it to the virtual machine or container that is allowed to make the request. When a call from within such a whitelisted virtual machine a request (e.g., a call to create a virtual VIP) comes, because the hypervisor is in the data path for all such requests it can check:

1. If the virtual machine is whitelisted to make such a request; and
2. If the access type is allowed for the virtual machine (to apply fine-grained checks).

Figure 6:
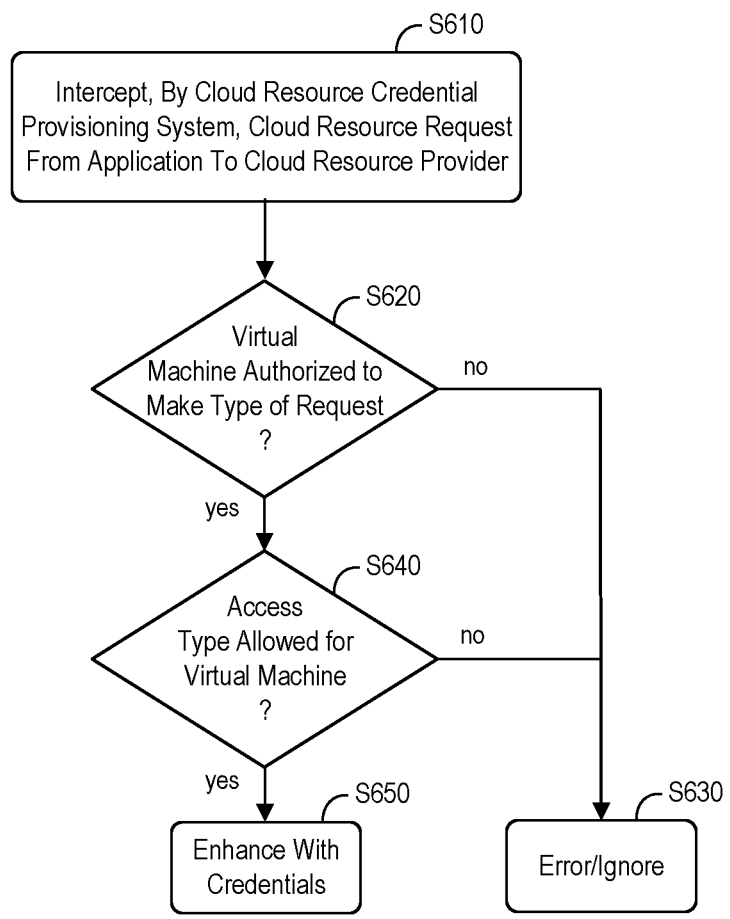
FIG. 6 is a validation method according to some embodiments.

FIG. 6 is a validation method according to some embodiments. At S610, a cloud resource credential provisioning system intercepts a cloud resource request form an application to a cloud resource provider. If the request is not associated with a virtual machine authorized to make such a request at S620, the call may be ignored and/or an error may be generated at S630. If the request is associated with a virtual machine authorized to make such a request at S620, the system determine if the access type is allowed for the virtual machine at S640. If not, the call may be ignored and/or an error may be generated at S630.

If the access type is allowed for the virtual machine at S640, the hypervisor may add the credentials to the request (e.g., "extending" the call) and this will allow the call to go through. This also allows for central policies, such as credential rotation, to be applied seamlessly and even when a virtual machine is compromised, an attacker will not see any credentials.

Figure 7:
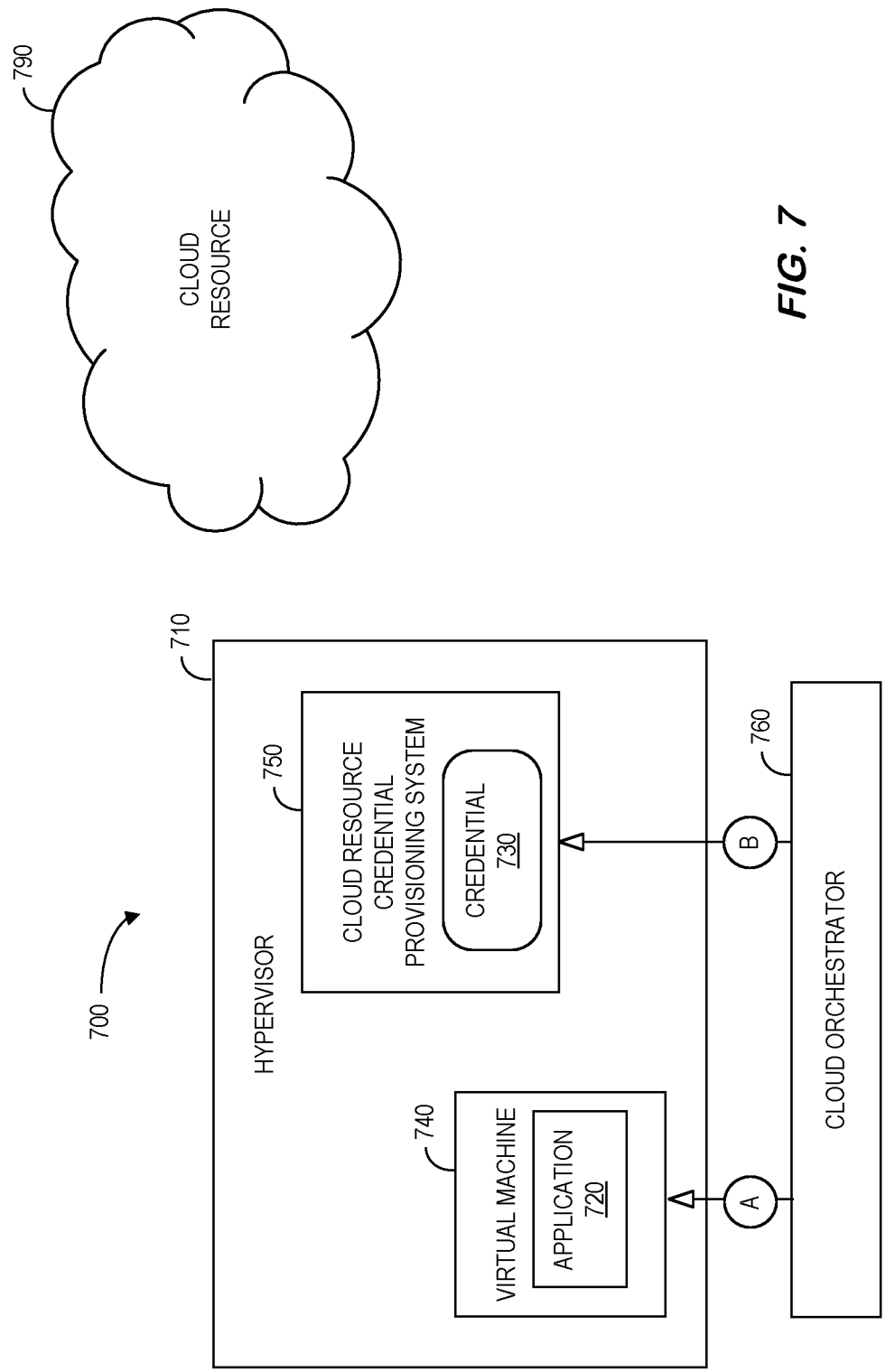
FIG. 7 is virtual machine-based system provisioning in accordance with some embodiments.

According to some embodiments, a cloud resource credential provisioning system executes in a hypervisor external to a virtual machine executing an application within the hypervisor. In this case, a cloud resource call might comprise a HTTP call from the application to the cloud provider. For example, FIG. 7 is a workflow for virtual machine-based system 700 provisioning in accordance with some embodiments. During provisioning of a virtual machine 740 to execute an application 720 at (A), a cloud orchestrator 760 may read a service configuration. If the service configuration defines a cloud resource 790 type and access type, upon creation of the virtual machine 740, the cloud orchestrator 760 will invokes an AttachResourceAPI at (B). The AttachResourceAPI may create a cloud resource credential provisioning system 750 (with credentials 730) that maps between the virtual machine 740 and the resource and access type. The information mapping may be persisted on the underlying hypervisor 710.

Figure 8:
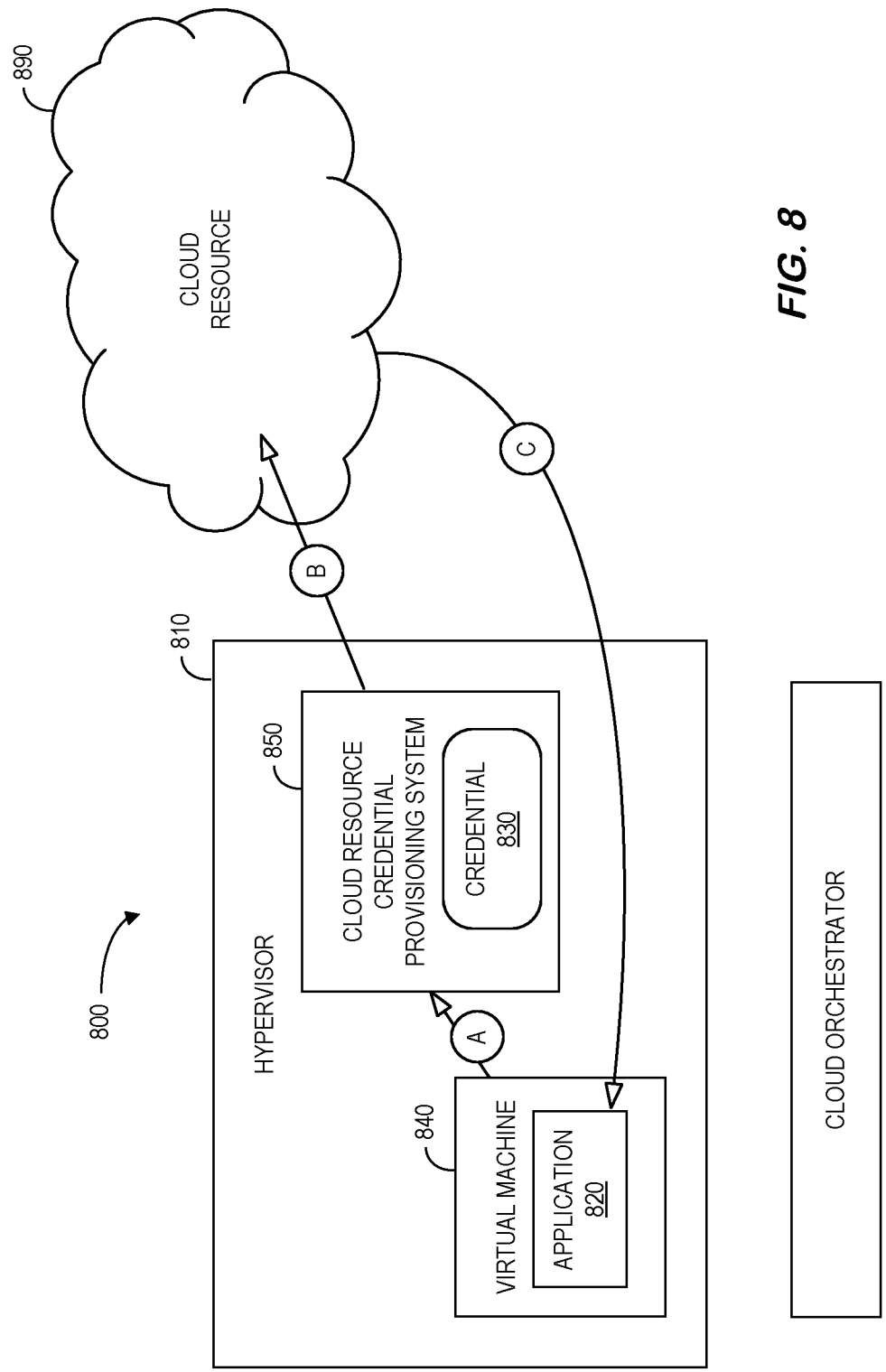
FIG. 8 is a virtual machine-based system at run time according to some embodiments.

FIG. 8 is a workflow for a virtual machine-based system 800 at run time according to some embodiments. When an application 820 within a virtual machine 840 needs to access a cloud resource 890, the application 820 makes an HTTP call to the cloud resource provider 890 at (A). According to some embodiments, the call may be associated with a Kernel Virtual Machine ("KVM") goes over a virtio-net virtual device to a hypervisor 810. Since the hypervisor 810 is in data path, it checks from which virtual machine 840 this request originated and does the following:

checks the mapping table to see if there is a mapping for such a virtual machine; and checks the allowed access type.

If these two checks succeed, the call is enhanced with the mapped credentials at (B). The response may then go back to the virtual machine via the same path at (C).

Figure 9:
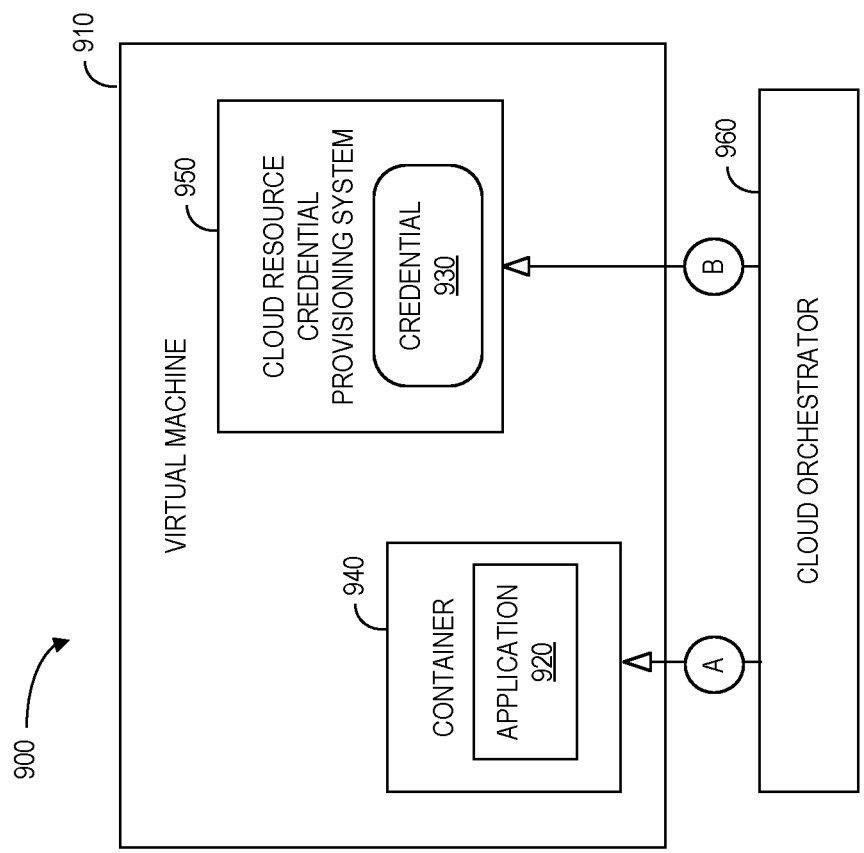
FIG. 9 is container-based system provisioning in accordance with some embodiments.

In other embodiments, a cloud resource credential provisioning system executes in a virtual machine external to a container executing an application within the virtual machine. This these cases, a cloud resource call might comprise an outbound network call via an overlay network to a service container that is intercepted by an eBPF program. For example, FIG. 9 is a workflow for container-based system 900 provisioning in accordance with some embodiments. During provisioning of a container 940 executing an application 920 at (A), a cloud orchestrator 960 (such as K8s/Swarm) reads a service configuration. The service configuration may define, for example, credentials 930, the protocol, an authentication method, and an access type. The cloud orchestrator may look at a configure Container Credential Interface ("CCI") and invokes an attach API of the CCI interface at (B). The attach API takes the credentials 930 and stores them at a cloud resource credential provisioning system 950 the virtual machine 910 and maps the meta-data (such as container identifier, authentication method, resource type, and access type).

Figure 10:
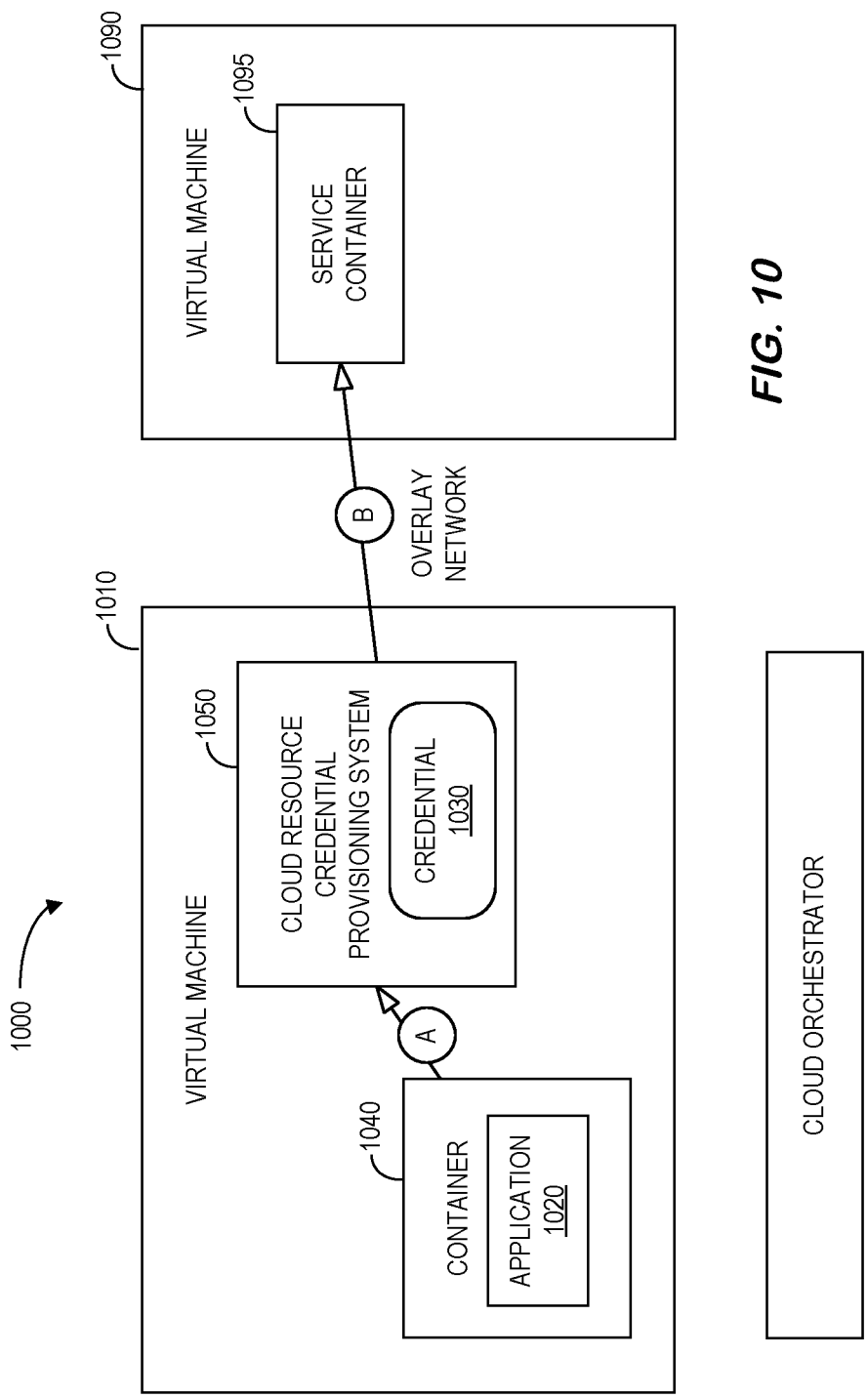
FIG. 10 is a container-based system at run time according to some embodiments.

FIG. 10 is a workflow for a container-based system 1000 at run time according to some embodiments. When an application 1020 within a container 1040 needs to access a resource for which the mapping exists on a virtual machine 1010, the application 1020 from within the container 1040 will make an outbound network call (A) to a service container 1095. The call comes to a virtual machine 1010 where am eBPF program associated with a cloud resource credential provisioning system will pick up the call and enhance the payload with the credential 1030 at (B) after validating the access allowed. The call may reach the service container 1095 of another virtual machine 1090 via an overlay network. The response may then go back to the container 1040 back over the overlay.

Figure 11:
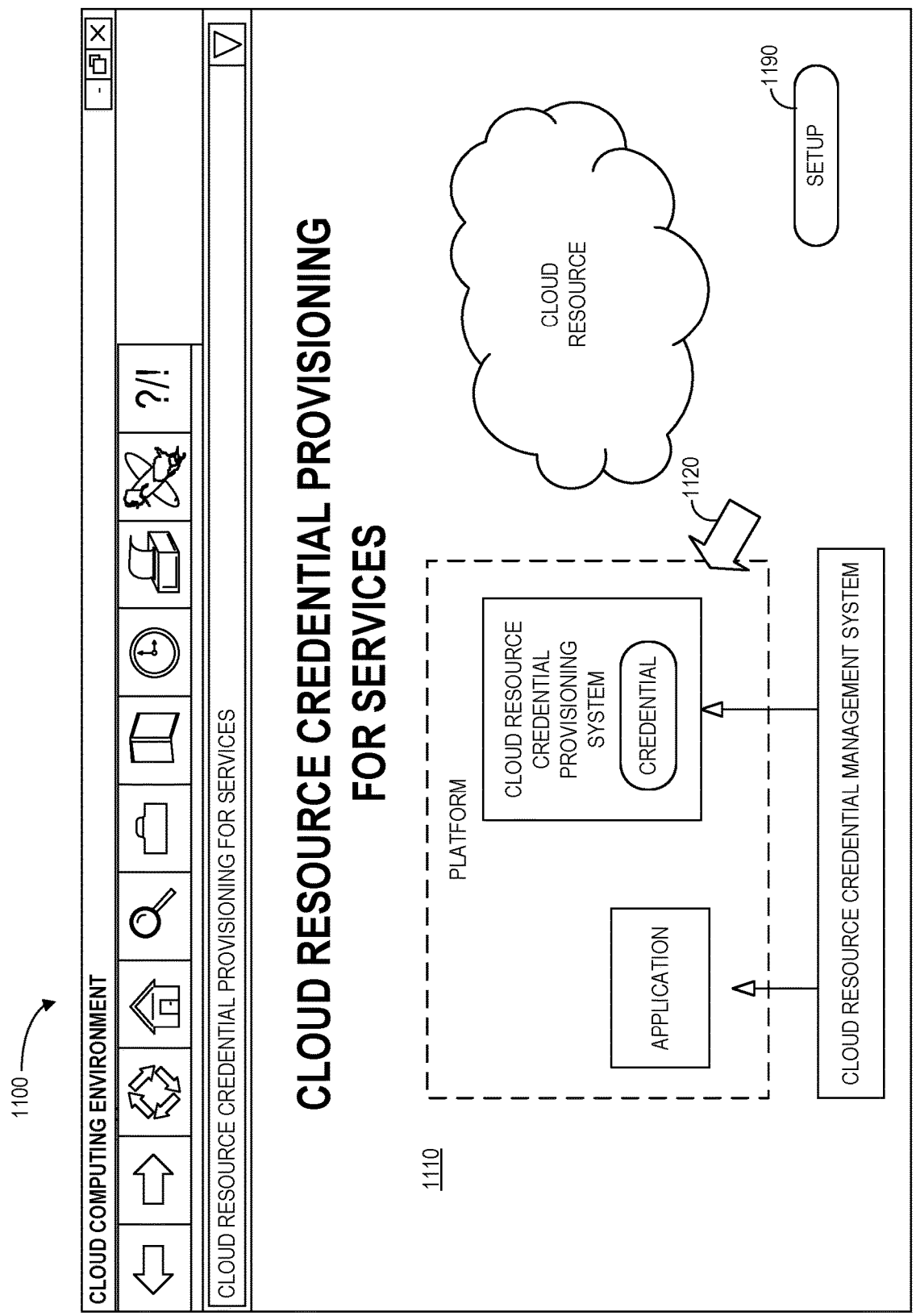
FIG. 11 is a human machine interface display according to some embodiments.

FIG. 11 is a human machine interface display 1100 in accordance with some embodiments. The display 1100 includes a graphical representation 1110 of elements of credential management/provisioning system for a cloud computing environment (e.g., to securely provide cloud resources to applications). Selection of an element (e.g., via a touch-screen or computer pointer 1120) may result in display of a pop-up window containing various options (e.g., to view access types or whitelists, the status of application calls, etc.). The display 1100 may also include a user-selectable "Setup" icon 1130 (e.g., to configure parameters for cloud management/provisioning (e.g., to alter or adjust an automated management/provisioning process as described with respect any of the embodiments of FIGS. 2 through 10).

Figure 12:
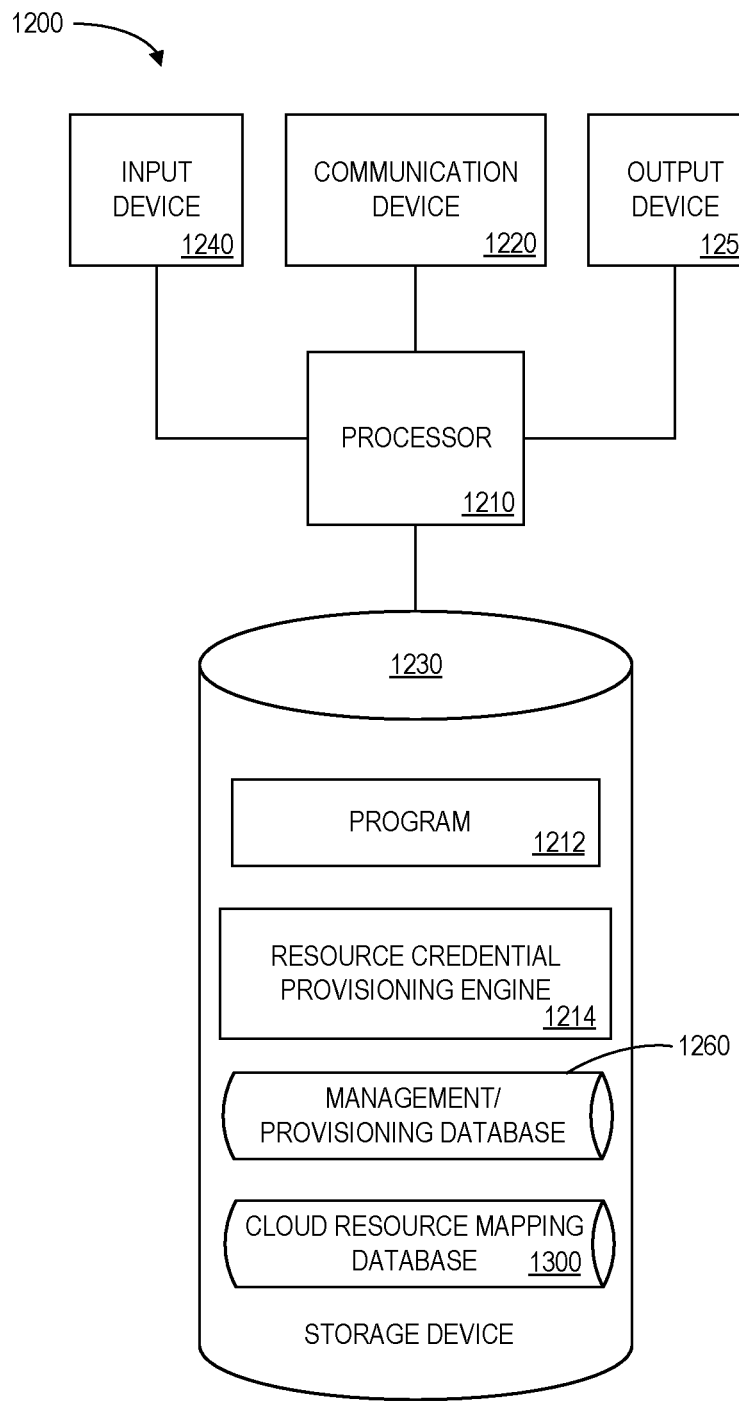
FIG. 12 is an apparatus or platform according to some embodiments.

Note that the embodiments described herein may be implemented using any number of different hardware configurations. For example, FIG. 12 is a block diagram of an apparatus or platform 1200 that may be, for example, associated with the system 200 of FIG. 2 (and/or any other system described herein). The platform 1200 comprises a processor 1210, such as one or more commercially available Central Processing Units ("CPUs") in the form of one-chip microprocessors, coupled to a communication device 1260 configured to communicate via a communication network (not shown in FIG. 12). The communication device 1220 may be used to communicate, for example, with one or more remote user platforms, cloud resource providers, etc. The platform 1200 further includes an input device 1240 (e.g., a computer mouse and/or keyboard to input credential information) and/an output device 1250 (e.g., a computer monitor to render a display, transmit recommendations, and/or create data center reports). According to some embodiments, a mobile device and/or PC may be used to exchange information with the platform 1200.

The processor 1210 also communicates with a storage device 1230. The storage device 1230 can be implemented as a single database or the different components of the storage device 1230 can be distributed using multiple databases (that is, different deployment information storage options are possible). The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or resource credential provisioning engine 1214 for controlling the processor 1210. The processor 1210 performs instructions of the programs 1212, 1214, and thereby operates in accordance with any of the embodiments described herein. For example, the processor 1210 may be provisioned as part of a virtual machine deployment and access information associated with an application or a service configuration file. The processor 1210 may then establish a cloud resource credential provisioning system external to an application to be executed in connection with the virtual machine (mapping a cloud resource policy and a cloud resource credential). In other embodiments, the processor 1210 may intercept a cloud resource call from the application to a cloud resource provider and validate that the cloud call request complies with the cloud resource policy. If the cloud resource call complies with the cloud resource policy, the processor 1210 may extend the cloud resource call with the cloud resource credential and forward the extended cloud resource call to the cloud resource provider.

The programs 1212, 1214 may be stored in a compressed, uncompiled and/or encrypted format. The programs 1212, 1214 may furthermore include other program elements, such as an operating system, clipboard application, a database management system, and/or device drivers used by the processor 1210 to interface with peripheral devices.

As used herein, information may be "received" by or "transmitted" to, for example: (i) the platform 1200 from another device; or (ii) a software application or module within the platform 1200 from another software application, module, or any other source.

In some embodiments (such as the one shown in FIG. 12), the storage device 1230 further stores a cloud resource management/provisioning database 1260 and a cloud resource mapping database 1300. An example of a database that may be used in connection with the platform 1200 will now be described in detail with respect to FIG. 13. Note that the database described herein is only one example, and additional and/or different information may be stored therein. Moreover, various databases might be split or combined in accordance with any of the embodiments described herein.

Figure 13:
FIG. 13 illustrates a cloud resource mapping database in accordance with some embodiments.

Referring to FIG. 13, a table is shown that represents the cloud resource mapping database 1300 that may be stored at the platform 1300 according to some embodiments. The table may include, for example, entries mapping cloud resources (e.g., for a cloud provider) that may be utilized by applications. The table may also define fields 1302, 1304, 1306, 1308, for each of the entries. The fields 1302, 1304, 1306, 1308 may, according to some embodiments, specify: an application identifier 1302, a virtual machine identifier 1304, a resource type 1306, and an access type 1308. The cloud resource mapping database 1300 may be created and updated, for example, when new applications are added or deleted, virtual machines are created, etc. According to some embodiments, the cloud resource mapping database 1300 may further store credential information (e.g., a link to where credential information may be found).

The application identifier 1302 might be a unique alphanumeric label or link that is associated with a particular application that may execute in a cloud computing environment (and that may require access to cloud resources. The virtual machine identifier 1304 may be associated with a data center virtual machine (and may be associated with a whitelist of approved virtual machines for particular types of cloud resources). The resource type 1306 may indicate, for example, object storage, virtual IP attachment, etc. The access type 1308 may indicate, for example, create, delete, bind, update, role-based access types, etc.

Thus, embodiments may provide resource credential provisioning for a cloud computing environment in a secure, automatic, and accurate manner. Moreover, for both virtual machines and containers, embodiments may mitigate the need to manage any credentials within a virtual machine or container run time. In addition, embodiments may allow for better management of credentials at the orchestrator layer (where central policies can be applied) and help remove the potential attack vector of a compromised application leaking credentials.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
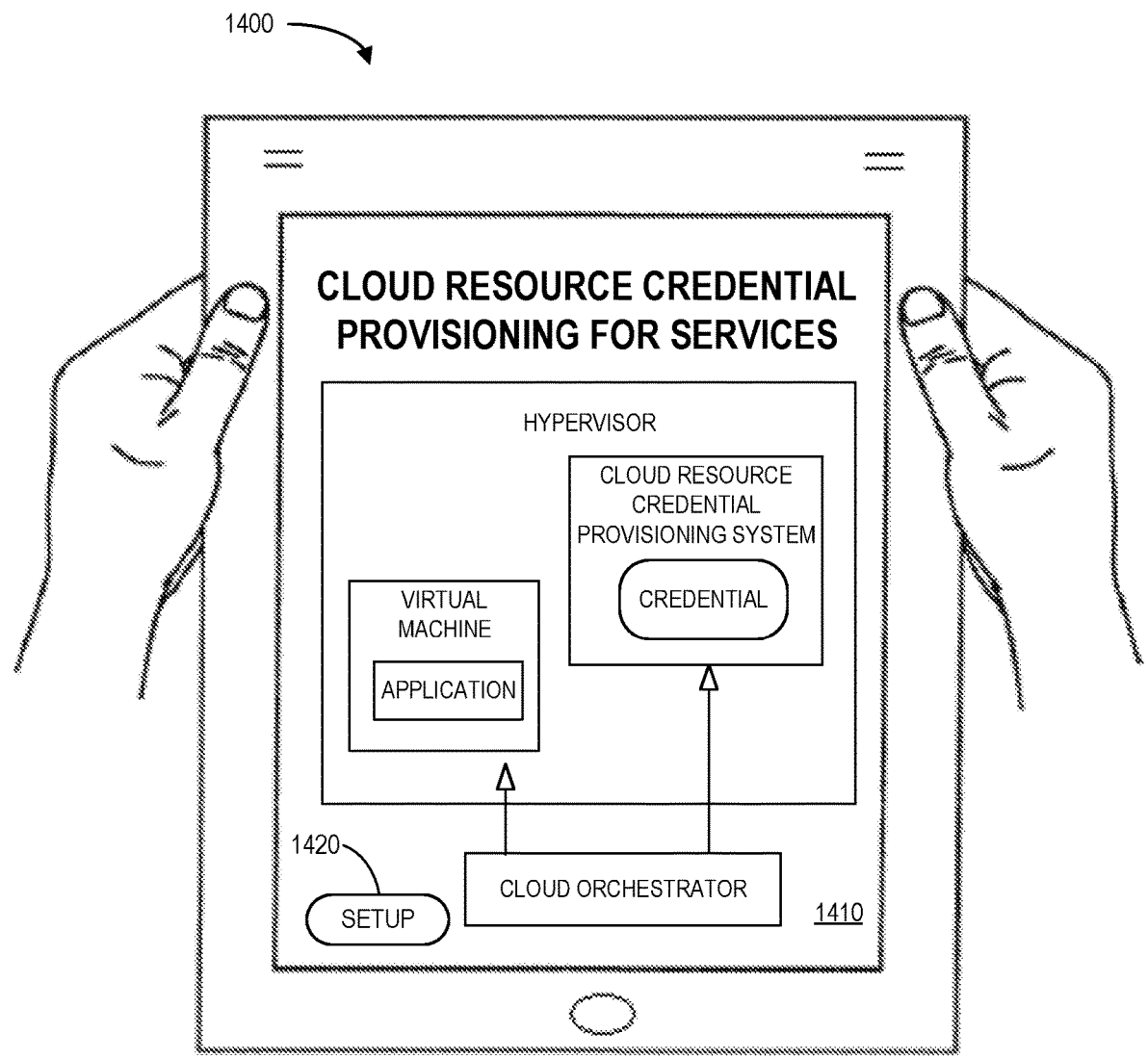
FIG. 14 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of item and contracts, any of the embodiments described herein could be applied to other types of items and contracts. In addition, the displays shown herein are provided only as examples, and any other type of user interface could be implemented. For example, FIG. 14 shows a tablet computer 1400 rendering a cloud resource credential provisioning for services display 1410. The display may, according to some embodiments that may be used to view more detailed elements about components of the system (e.g., when a graphical element is selected via a touchscreen) or to configure operation of the system (e.g., to establish a central credential policy via a "Setup" icon 1420).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud computing environment, comprising:
a cloud resource credential management system that is separate from a hypervisor running a virtual machine, associated with a cloud orchestrator, provisioned as part of deploying the virtual machine in the hypervisor to access information associated with an application or a service configuration file and establish a cloud resource credential provisioning system external to the application to be executed in connection with the virtual machine, wherein the cloud resource credential provisioning system executes in the hypervisor external to the virtual machine executing the application and maps a cloud resource policy and a cloud resource credential; and
the cloud resource credential provisioning system to:
(i) intercept a cloud resource call from the application to a cloud resource provider,
(ii) validate that the cloud resource call complies with the cloud resource policy, and
(iii) if the cloud resource call complies with the cloud resource policy, extend the cloud resource call with the cloud resource credential and forward the extended cloud resource call to the cloud resource provider.

2. The system of claim 1, wherein the cloud resource call is associated with at least one of: (i) object storage, (ii) a control plane Application Programming Interface ("API"), and (iii) virtual Internet Protocol ("IP") attachment.

3. The system of claim 1, wherein the cloud orchestrator establishes the cloud resource provisioning system via an attach resource Application Programming Interface ("API").

4. The system of claim 3, wherein the attach resource API includes a resource name, an application identifier, and a cloud resource access type.

5. The system of claim 4, wherein the access type is associated with at least one of create, delete, bind, and a role-based access type.

6. The system of claim 1, wherein the cloud resource call comprises a Hyper Text Transfer Protocol ("HTTP") call from the application to the cloud provider.

7. The system of claim 1, wherein the cloud resource credential management system is further to implement a credential policy across a plurality of virtual machines.

8. The system of claim 7, wherein the credential policy comprises a credential rotation policy.

9. A computer-implemented method associated with a cloud computing environment, comprising:
provisioning a cloud resource credential management system that is separate from a hypervisor running a virtual machine, associated with a cloud orchestrator, as part of deploying the virtual machine in the hypervisor;
accessing, by the cloud resource credential management system, information associated with an application or a service configuration file;
establishing, by the cloud resource credential management system, a cloud resource credential provisioning system external to the application to be executed in connection with the virtual machine, wherein the cloud resource credential provisioning system executes in the hypervisor external to the virtual machine executing the application and maps a cloud resource policy and a cloud resource credential;
intercepting, by the cloud resource credential provisioning system, a cloud resource call from the application to a cloud resource provider, wherein the cloud resource call is associated with a virtual Internet Protocol ("IP") attachment;
validating, by the cloud resource credential provisioning system, that the cloud resource call complies with the cloud resource policy; and
if the cloud resource call complies with the cloud resource policy, extending, by the cloud resource credential provisioning system, the cloud resource call with the cloud resource credential and forward the extended cloud resource call to the cloud resource provider.

10. The method of claim 9, wherein the cloud orchestrator establishes the cloud resource provisioning system via an attach resource Application Programming Interface ("API").

11. The method of claim 10, wherein the attach resource API includes a resource name, an application identifier, and a cloud resource access type.

12. The method of claim 11, wherein the access type is associated with at least one of create, delete, bind, and a role-based access type.

13. A non-transitory, computer readable medium having executable instructions stored therein, the medium comprising:
instruction to provision a cloud resource credential management system that is separate from a hypervisor running a virtual machine, associated with a cloud orchestrator, as part of deploying the virtual machine in the hypervisor;

instruction to access, by the cloud resource credential management system, information associated with an application or a service configuration file;

instruction to establish, by the cloud resource credential management system, a cloud resource credential provisioning system external to the application to be executed in connection with the virtual machine, wherein the cloud resource credential provisioning system (1) executes in the hypervisor external to the virtual machine executing the application and (2) maps a cloud resource policy and a cloud resource credential;

instruction to intercept, by the cloud resource credential provisioning system, a cloud resource call from the application to a cloud resource provider;

instruction to validate, by the cloud resource credential provisioning system, that the cloud resource call complies with the cloud resource policy; and if the cloud resource call complies with the cloud resource policy, instruction to extend, by the cloud resource credential provisioning system, the cloud resource call with the cloud resource credential and forward the extended cloud resource call to the cloud resource provider.

* * * * *